US011867156B2

(12) United States Patent
Herrig et al.

(10) Patent No.: US 11,867,156 B2
(45) Date of Patent: Jan. 9, 2024

(54) SYSTEM AND METHOD FOR MITIGATING VORTEX-SHEDDING VIBRATIONS OR STALL-INDUCED VIBRATIONS ON ROTOR BLADE OF A WIND TURBINE DURING STANDSTILL

(71) Applicant: General Electric Company, Schenectady, NY (US)

(72) Inventors: Andreas Herrig, Garching b. Muenchen (DE); Benjamin Patrick Hallissy, Greenville, SC (US); Marc Canal, Barcelona (ES); Jordy Hertel Nilsson van Kalken, Lunderskov (DK)

(73) Assignee: General Electric Company, Schenectady, NY (US)

( * ) Notice: Subject to any disclaimer, the term of this patent is extended or adjusted under 35 U.S.C. 154(b) by 437 days.

(21) Appl. No.: 17/023,457

(22) Filed: Sep. 17, 2020

(65) Prior Publication Data

US 2021/0079896 A1    Mar. 18, 2021

(30) Foreign Application Priority Data

Sep. 18, 2019   (EP) .................................... 19382809

(51) Int. Cl.
*F03D 80/50*    (2016.01)
*F03D 3/04*    (2006.01)

(52) U.S. Cl.
CPC ................ *F03D 80/50* (2016.05); *F03D 3/04* (2013.01); *F05B 2230/80* (2013.01); *F05B 2260/30* (2013.01); *F05B 2260/96* (2013.01)

(58) Field of Classification Search
CPC .. F03D 80/00; F05B 2230/80; F05B 2260/96; F15D 1/002; B64C 23/06
See application file for complete search history.

(56) References Cited

U.S. PATENT DOCUMENTS

| 6,672,837 | B1 | 1/2004 | Veldkamp et al. |
| 7,740,206 | B2 | 6/2010 | Eaton et al. |
| 7,837,439 | B2 | 11/2010 | Bech |

(Continued)

FOREIGN PATENT DOCUMENTS

| CN | 114687960 A | * | 7/2022 |
| EP | 2362091 A1 | | 8/2011 |

(Continued)

OTHER PUBLICATIONS

EP Office Action for EP application No. 19382809.2., dated Feb. 14, 2023, 5 pages.

*Primary Examiner* — Christopher R Legendre
(74) *Attorney, Agent, or Firm* — Dority & Manning, P.A.

(57) ABSTRACT

An apparatus for mitigating vortex-shedding vibrations or stall-induced vibrations on one or more rotor blades of a wind turbine during standstill includes at least one positioning element located between a blade tip section and a blade root section thereof. The positioning element is adapted for wrapping around at least a portion of the rotor blade. The apparatus also includes at least one airflow modifying element coupled to the positioning element and defining a height relative to a surface of the rotor blade. Additionally, the apparatus includes at least one securing element operably coupled to the positioning element for temporarily securing the airflow modifying element to the rotor blade.

9 Claims, 7 Drawing Sheets

(56) References Cited

U.S. PATENT DOCUMENTS

| | | | |
|---|---|---|---|
| 7,988,416 B2 | 8/2011 | Westergaard | |
| 7,988,421 B2 | 8/2011 | Bakhuis et al. | |
| 8,192,161 B2 | 6/2012 | Baker et al. | |
| 8,210,469 B2 | 7/2012 | Nitzsche et al. | |
| 8,267,654 B2 | 9/2012 | van Dam et al. | |
| 8,657,561 B2 | 2/2014 | Buffone et al. | |
| 8,749,084 B2 | 6/2014 | Gjerlov et al. | |
| 8,777,580 B2 * | 7/2014 | Eisenberg | F03D 1/0641 416/239 |
| 9,261,080 B2 | 2/2016 | Ededal et al. | |
| 9,316,202 B2 | 4/2016 | Bech | |
| 2008/0061192 A1 | 3/2008 | Sullivan | |
| 2010/0139062 A1* | 6/2010 | Reed | F03D 13/10 29/889.1 |
| 2011/0164975 A1 | 7/2011 | Vyas | |
| 2012/0251318 A1 | 10/2012 | Caso Prieto et al. | |
| 2013/0255796 A1 | 10/2013 | Dimascio et al. | |
| 2014/0050580 A1 | 2/2014 | Hagen et al. | |
| 2016/0305403 A1 | 10/2016 | Zheng et al. | |
| 2016/0369770 A1 | 12/2016 | Vuillaume et al. | |
| 2017/0002797 A1 | 1/2017 | Chen et al. | |
| 2017/0370386 A1 | 12/2017 | Wardropper et al. | |
| 2021/0079896 A1* | 3/2021 | Herrig | F03D 3/04 |

FOREIGN PATENT DOCUMENTS

| | | |
|---|---|---|
| EP | 2577050 B1 | 4/2015 |
| WO | WO02084114 A1 | 10/2002 |
| WO | WO2014022910 A1 | 2/2014 |
| WO | WO2015053768 A1 | 4/2015 |

* cited by examiner

SYSTEM AND METHOD FOR MITIGATING VORTEX-SHEDDING VIBRATIONS OR STALL-INDUCED VIBRATIONS ON ROTOR BLADE OF A WIND TURBINE DURING STANDSTILL

FIELD

The present disclosure relates in general to wind turbines, and more particularly to systems and methods for mitigating vortex-shedding vibrations or stall-induced vibrations on a rotor blade of a wind turbine during standstill.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

During the lifespan of the wind turbine, there may, from time to time, be periods where the rotor blades are parked or idled. For example, the wind turbine is generally locked in a fixed position during installation or repair of the rotor blades. In another instance, the rotor blades may be pitched so as to idle the wind turbine during a maintenance procedure. Often, during such maintenance or installation procedures, or in response to a system failure, the ability to pitch the rotor blades or yaw the nacelle relative to the wind may be lost. Thus, when modern wind turbines are parked or idled, they are put at risk for flow-induced oscillations caused by the wind.

In one instance, the flow-induced oscillations may be the result of the wind primarily impacting a side, as opposed to an edge, of the rotor blade. When the wind impacts the edge(s) in such a manner, the wind attempts to flow around the slender structure of the rotor blade and form a vortex at the point where the flow separates from the rotor blade. Depending on the relative angle between the wind and the rotor blade, a vortex-shedding phenomenon may occur where the vortices form on the edges of the blade and are shed in a rhythmic pattern from alternating edges. The alternating nature of the edgewise vortex shedding may result in a vibration of the rotor blade. When the vortex shedding frequency coincides with, or is sufficiently close to, a natural frequency of the structure, large and damaging vibrations may be the result.

A known method for limiting vortex-induced vibrations is to feather the rotor blade with respect to the wind so that the wind flows smoothly around the rotor blade. However, without the ability to adjust the position of the rotor blade, the wind direction generally shifts and increases the angle of attack of the rotor blade. At a sufficiently high angle of attack, the flow over the rotor blade separates, thereby resulting in a rotor blade in a stall condition. The separated, stalled flow is unstable and can result in stall-induced vibrations.

In view of the aforementioned issues, the art is continuously seeking new and improved systems and methods for mitigating vortex-shedding vibrations or stall-induced vibrations. Thus, a system and method for mitigating vortex-shedding vibrations or stall-induced vibrations on one or more rotor blades of a wind turbine during standstill would be advantageous.

BRIEF DESCRIPTION

Aspects and advantages of the invention will be set forth in part in the following description, or may be obvious from the description, or may be learned through practice of the invention.

In one aspect, the present disclosure is directed to an apparatus for mitigating vortex-shedding vibrations or stall-induced vibrations on one or more rotor blades of a wind turbine during standstill. The apparatus may have at least one positioning element located between a blade tip section and a blade root section thereof. The positioning element(s) is adapted for wrapping around at least a portion of the rotor blade. The apparatus may also have at least one air flow modifying element coupled to the positioning element(s). The airflow modifying element(s) may define a height relative to a surface of the rotor blade. Additionally, the apparatus may include at least one securing element operably coupled to the positioning element(s) for temporarily securing the airflow modifying element(s) to the rotor blade.

In an embodiment, the positioning element(s) may include at least one cord member helically wrapped around a portion of the rotor blade. In an additional embodiment, the helically-wrapped cord element may have a pitch greater than or equal to one half of a chord of the rotor blade up to less than or equal to 6 times the chord of the rotor blade. At least a portion of the helically-wrapped cord element may be separated from the surface of the rotor blade by a distance defined by the airflow modifying element(s).

In an embodiment, the airflow modifying element(s) may include at least one of a streamer, a fence, an inflatable cell, a serration, a vortex generator, and/or a flow disruptor.

In an embodiment, the airflow modifying element(s) may include a plurality of airflow modifying elements distributed along and secured to the positioning element(s). In another embodiment, the plurality of airflow modifying elements may include leading-edge airflow modifying elements and trailing-edge airflow modifying elements. The leading-edge airflow modifying elements and the trailing-edge airflow modifying elements may be distributed in an alternating pattern along the positioning element(s).

In an embodiment, the airflow modifying element(s) may include at least one leading-edge airflow modifying element and at least one trailing-edge airflow modifying element disposed opposite thereof. The positioning element(s) may be constructed of an elastic cord element coupled between the leading- and trailing-edge airflow modifying elements. The elastic cord element may limit a separation between the leading- and/or trailing-edge airflow modifying elements at a specified span location of the rotor blade.

In an embodiment, the positioning element(s) may include a leading-edge positioning element arranged parallel to a leading edge of the rotor blade and a trailing-edge positioning element arranged parallel to a trailing edge of the rotor blade. The airflow modifying element(s) may include at least one leading-edge airflow modifying element coupled to the leading-edge positioning element and at least one trailing-edge airflow modifying element coupled to the trailing-edge positioning element. The leading-edge airflow modifying element may define a leading-edge notch corresponding to a leading-edge profile. The trailing-edge airflow modifying element may define a trailing-edge mounting notch corresponding to a trailing-edge profile.

In an embodiment, the airflow modifying element(s) may have a mounting edge. The airflow modifying element may be coupled along the mounting edge to the positioning element(s). The positioning element(s) may be oriented perpendicular to a chordwise direction of the rotor blade. The positioning element(s) may be temporarily coupled to at least one of a leading edge, a trailing edge, or along a line upstream of a flow separation point on either a suction side or a pressure side of the rotor blade. In an additional embodiment, the positioning element(s) may include a cord oriented spanwise along the rotor blade. In such embodiments, the securing element(s) may include a first securing element coupled to a first end of the positioning element and a second securing element coupled to an opposing, second end of the positioning element.

In a further embodiment, the positioning element(s) may include a hollow sleeve configured to encapsulate a portion of the rotor blade. The hollow sleeve may define at least one inlet air hole.

In another aspect, the present disclosure is directed to a method for mitigating vortex-shedding vibrations or stall-induced vibrations on one or more rotor blades of a wind turbine during standstill. The method may include installing a vibration-mitigation apparatus on the rotor blade. The installation of the vibration-mitigation apparatus may include, for example, positioning at least one airflow modifying element at a desired location along an outer surface of a rotor blade with at least one positioning element and securing the positioning element(s) to the outer surface of the rotor blade via at least one securing element. The method may also include performing a maintenance and/or a repair operation on the wind turbine with the vibration-mitigation apparatus installed. Once the maintenance and/or repair operation is complete, the method may include removing the vibration-mitigation apparatus from the rotor blade.

In an embodiment, the airflow modifying element(s) may include at least one of a streamer, a fence, and inflatable cell, serration, a vortex generator, and/or a flow disruptor.

In a further embodiment, the positioning element(s) may include a cord element. In such embodiments, positioning the airflow modifying element(s) at the desired location may include helically wrapping the cord element around a portion of the rotor blade so as to disrupt airflow over a chordwise or spanwise section of the rotor blade. At least a portion of the positioning element(s) may be separated from the outer surface of the rotor blade by a distance defined by the airflow modifying element(s).

In an additional embodiment, positioning the airflow modifying element(s) at the desired location may include positioning an edge of the airflow modifying element(s) adjacent to at least one of a leading edge, a trailing edge, or along a line upstream of a flow separation point on either a suction side or a pressure side of the rotor blade.

In an embodiment, the positioning element(s) may include a hollow sleeve defining an inlet air hole and the airflow modifying element(s) may include the inflatable cell. In such embodiments, positioning the airflow modifying element(s) at the desired location may include encapsulating a portion of the rotor blade within the hollow sleeve and coupling the inflatable cell to the hollow sleeve and operably coupling the inflatable cell to the air hole. In addition, the inflatable cell may be disposed adjacent to a pressure side or a suction side of the rotor blade.

In another aspect, the present disclosure is directed to a rotor assembly for a wind turbine. The rotor assembly may include a rotor hub in standstill and at least one rotor blade. The rotor blade(s) may include a leading edge and a trailing edge disposed between a tip portion and a root portion opposite thereof. The root portion may be coupled to the rotor hub. The rotor assembly may also include an apparatus for mitigating vortex-shedding vibrations and/or stall-induced vibrations on the rotor blade(s) during standstill. The apparatus may include at least one positioning element located between a blade tip section and a blade root section thereof. The positioning element(s) may be adapted for wrapping around at least a portion of the rotor blade(s). The apparatus may also include at least one airflow modifying element coupled to the positioning element(s). The airflow modifying element(s) may define a height relative to a surface of the rotor blade. Additionally, the apparatus may include at least one securing element operably coupled to the airflow modifying element(s) for temporarily securing the airflow modifying element(s) to the rotor blade. It should be understood that the rotor blade assembly may further include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "upstream" and "downstream" refer to directions relative to the airflow. For example, a wind will contact an upstream feature prior to contacting a downstream feature.

Generally, the present disclosure is directed to an apparatus and method for mitigating vortex-shedding vibrations or stall-induced vibrations in a rotor blade of a wind turbine while the rotor blade is in standstill. The apparatus may be configured to temporarily attach to the rotor blade when the rotor blade is locked or idled and removed when the maintenance, repair, or installation procedure is completed. The apparatus may, in various embodiments, include at least one airflow modifying element coupled to at least one positioning element. The apparatus may be secured to the rotor blade and positioned so as to disrupt the flow of air over the locked or idling rotor blade. The apparatus may disrupt the rhythmic shedding of the vortices from the edges of the rotor blade by, for example, disrupting the formation of the vortices, fixing the location of the vortex shedding, or causing many vortices to be shed at fixed alternating locations, causing alternations of the mutual phase relationship. Additionally, the apparatus may be placed to increase the drag of the rotor blade, thereby destroying lift and preventing stall-induced vibrations. By disrupting the flow of air over the locked or idling rotor blade, the apparatus may mitigate the likelihood of large and damaging vibrations resulting the coincidence of a vibration with the natural frequency of the structure.

Figure 1:
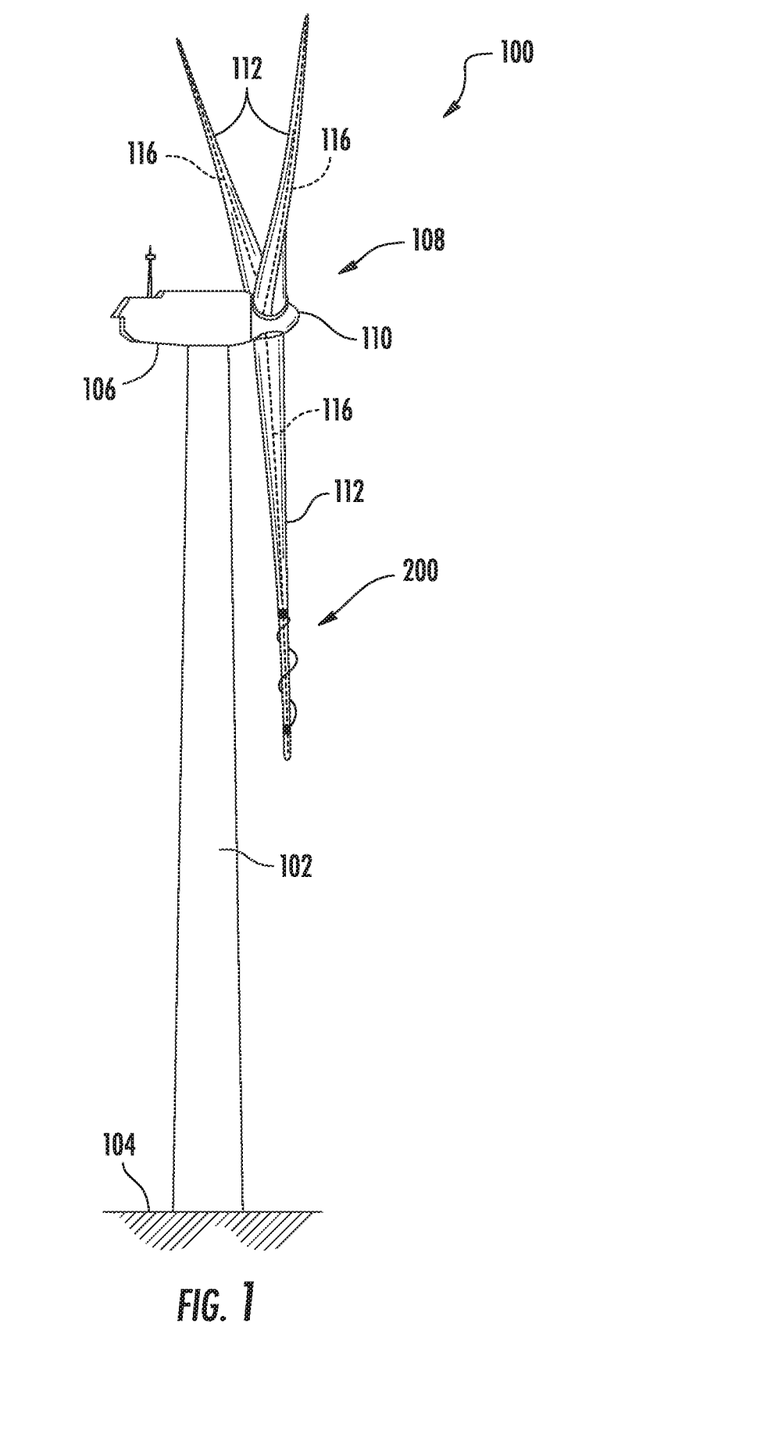
FIG. 1 illustrates a perspective view of one embodiment of a wind turbine with an installed apparatus for mitigating vortex-shedding vibrations or stall-induced vibrations according to the present disclosure.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106 mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator positioned within the nacelle 106 to permit electrical energy to be produced.

Figure 2:
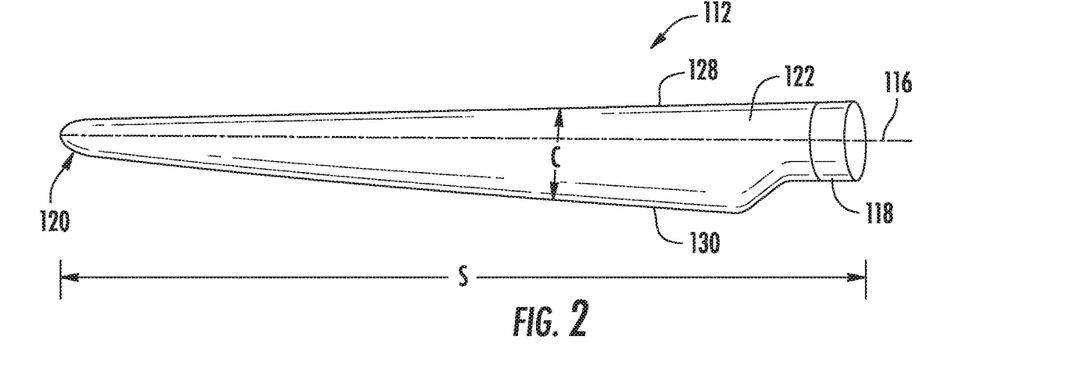
FIG. 2 illustrates a perspective view of one of the rotor blades of FIG. 1.

Referring now to FIG. 2, a perspective view of the rotor blade(s) 112 of the wind turbine 100 shown in FIG. 1 is illustrated. The rotor blade(s) 112 may generally include a blade root 118 configured to be mounted or otherwise secured to the hub 110 of the wind turbine 100 and a blade tip 120 disposed opposite the blade root 118. A body shell 122 of the rotor blade(s) 112 may generally extend between the blade root 118 and the blade tip 120 along a pitch axis 116. The body shell 122 may generally serve as the outer casing or surface or covering of the rotor blade(s) 112. The body shell 122 may define a substantially aerodynamic profile such as by defining a symmetrical or cambered airfoil-shaped cross-section. The body shell 122 may also define a pressure side 124 and a suction side 126 extending between a leading edge 128 and a trailing edge 130 of the rotor blade(s) 112. Further, the rotor blade(s) 112 may also have a span (S), which defines the total length between the blade root 118 and the blade tip 120. The rotor blade(s) 112 may also have a chord (C) defining the total length between the leading edge 128 and the trailing edge 130. As is generally understood, the chord (C) may vary in length with respect to the span (S) as the rotor blade(s) 112 extends from the blade root 118 to the blade tip 120.

Referring now to FIGS. 3A-8, various embodiments of an apparatus 200 for mitigating vortex-shedding vibrations and/or stall-induced vibrations on the rotor blade(s) 112 of the wind turbine 100 during standstill are illustrated according to the present disclosure. For example, in certain instances, the rotor blade(s) 112 may be in standstill when the hub 110 of the wind turbine 100 is braked, locked, or idling. As shown, the apparatus 200 may include at least one positioning element 202 located between the blade tip 120 and the blade root 118 sections of the rotor blade(s) 112. More specifically, as shown, the positioning element(s) 202 may be adapted for wrapping around at least a portion of the rotor blade(s) 112.

The apparatus 200 may also include at least one airflow modifying element 204 coupled to the positioning element(s) 202. The airflow modifying element(s) 204 may define a distance (H) relative to the body shell/surface 122 of the rotor blade(s) 112. The apparatus 200 may also include at least one securing element 206 operably coupled to the positioning element(s) 202 for temporarily securing the airflow modifying element(s) 204 to the rotor blade(s) 112. It should be appreciated that, in an embodiment, the positioning element(s) 202 may be separated from the surface, or body shell 122, of the rotor blade(s) 112 by a distance (H) defined by the airflow modifying element(s) 204.

In at least one embodiment, the positioning element(s) 202 may be a cord 208 having a plurality of yarns, plies, fibers, or strands which are braided or twisted together to form a generally circular cross section. For example, the cord 208 may be a natural or synthetic rope having a single-braid, double-braid, plaited, twisted, hollow, or diamond-braid construction. The cord 208 may, in an embodiment, include a plurality of buoyant fibers so as to enable the apparatus 200 to float. In an additional embodiment, maintaining a selected curvature of the positioning element(s) 202 may be facilitated by the inclusion of a malleable core material, such as a metal wire. In further embodiments, the positioning element(s) 202 may, for example, be a cable, a strap (e.g., a woven nylon strap), a ribbon, a pultrusion, or an elasticized cord (e.g., a bungee cord).

In an additional embodiment, the positioning element(s) 202 may be a coil spring. The positioning element(s) 202 may have a coiled length and an installed length. The installed length may be greater than the coiled length. The positioning element(s) 202 may have a resting coil diameter and an installed coil diameter which is less than the resting coil diameter. It should be appreciated that, applying a tension to stretch the positioning element(s) 202 to its installed length may result in the positioning element(s) 202 tightening around the rotor blade(s) 112, and that releasing the tension may allow the positioning element(s) 202 to return the resting coil diameter and release the rotor blade(s) 112.

In at least one embodiment, the positioning element(s) 202 may be helically wrapped around a portion of the blade 112. The helically-wrapped cord 208 may have a pitch greater than or equal to one half of the chord (C) of the rotor blade(s) 112. The helically-wrapped cord 208 may also have a pitch less than or equal to six times the chord (C).

Figure 5A:
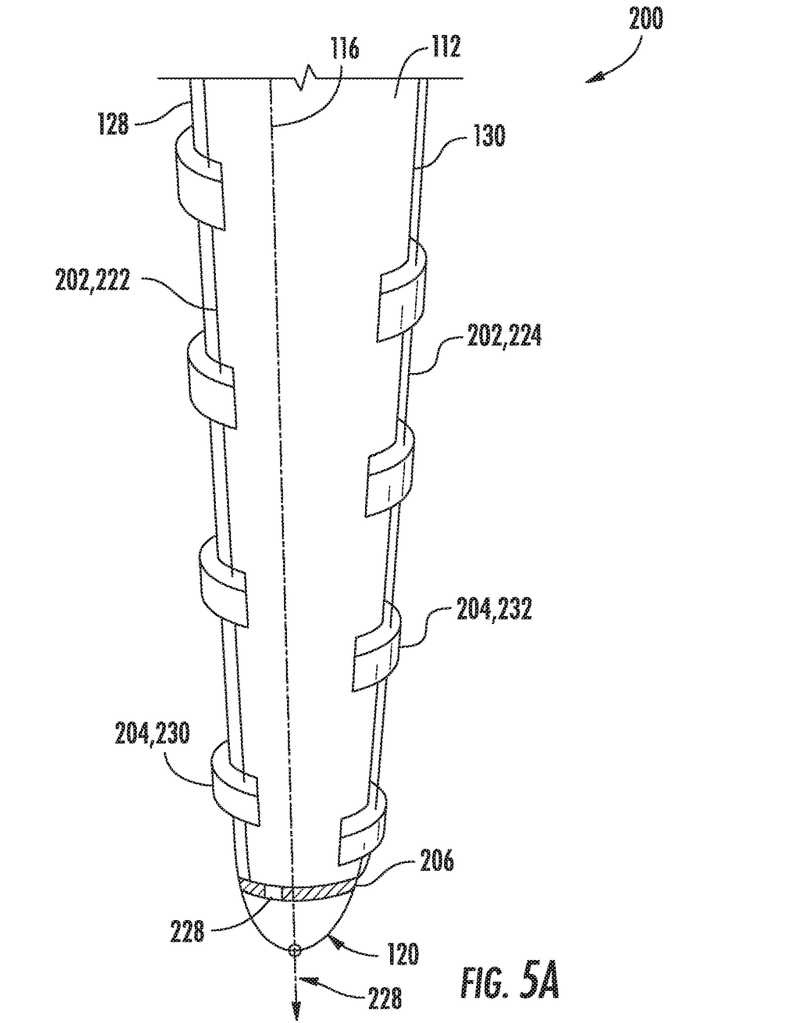
FIG. 5A illustrates a schematic view of a portion of the rotor blade of FIG. 2 according to the present disclosure, particularly illustrating still another embodiment of the apparatus for mitigating vortex-shedding vibrations or stall-induced vibrations installed thereon.
Figure 5B:
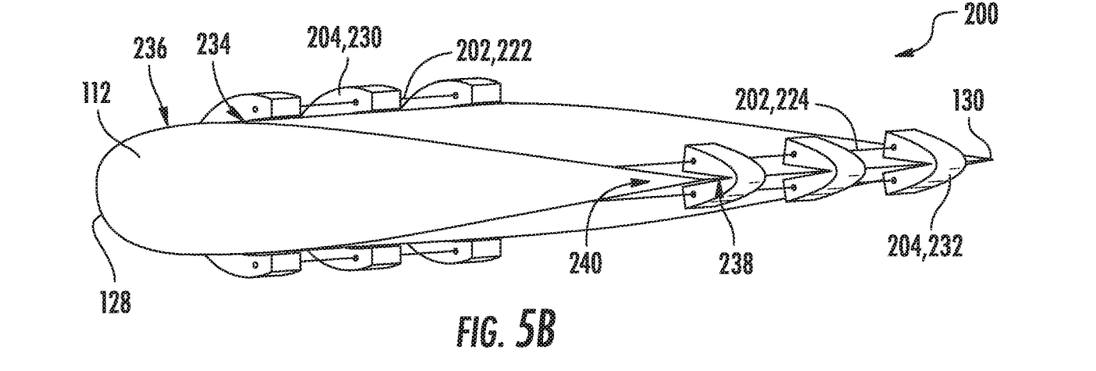
FIG. 5B illustrates a cross-sectional view of the rotor blade and apparatus of FIG. 5A according to the present disclosure.

It should be appreciated that, in additional embodiments, the positioning element(s) 202 may be positioned in different orientations relative to the rotor blade(s) 112. For example, the positioning element(s) 202 may be oriented generally parallel to the pitch axis 116, the leading edge 128, and/or the trailing edge 130. In at least one such embodiment, such as depicted in FIGS. 5A and 5B, the positioning element(s) 202 may include at least one leading-edge positioning element 222 arranged parallel to the leading edge 128. The positioning element(s) 202 may also include at least one trailing-edge positioning element 224 parallel to the trailing edge 130.

Figure 7:
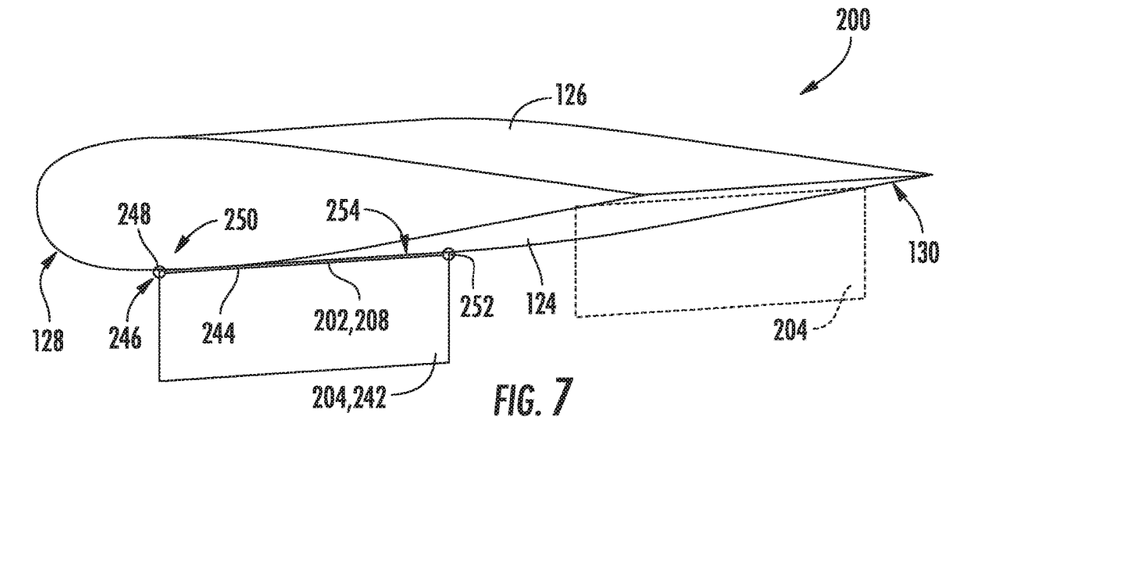
FIG. 7 illustrates a perspective view of a portion of the rotor blade of FIG. 2 according to the present disclosure, particularly illustrating a further embodiment of an apparatus for mitigating vortex-shedding vibrations or stall-induced vibrations installed thereon.

In an alternative embodiment, the cord 208 may be stretched between the blade tip 120 and the hub 110 or between securing elements 206. The cord 208 may, as depicted in FIG. 7, be positioned along a line upstream of an anticipated flow separation point on either the suction side 126 or the pressure side 124 of the rotor blade(s) 112.

Figure 6A:
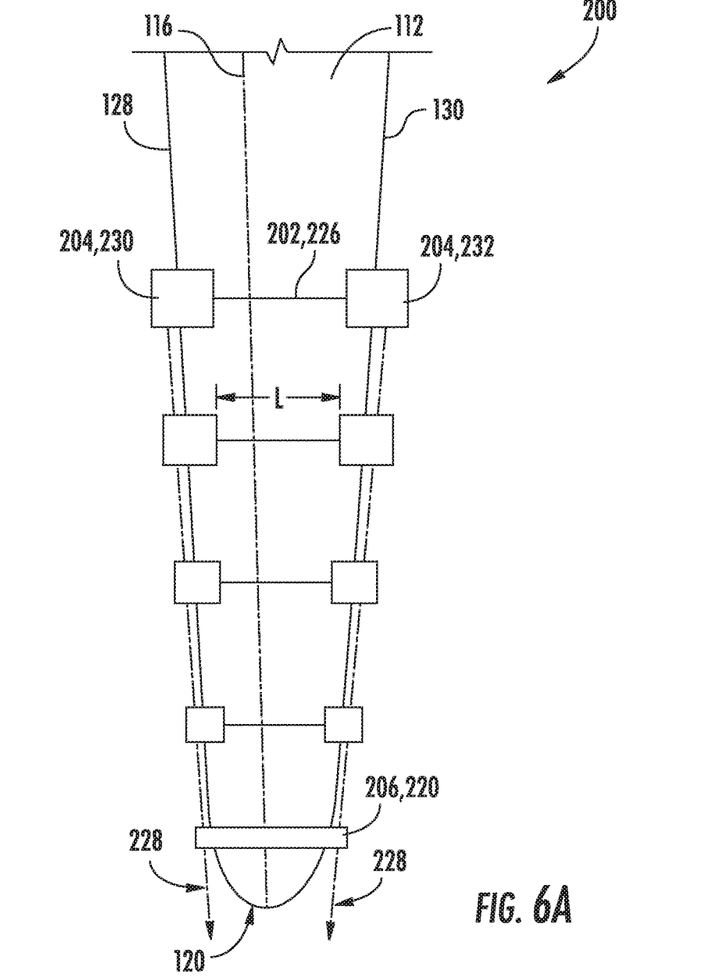
FIG. 6A illustrates a schematic view of a portion of the rotor blade of FIG. 2 according to the present disclosure, particularly illustrating yet another embodiment of the apparatus for mitigating vortex-shedding vibrations or stall-induced vibrations installed thereon.

As depicted in FIG. 6A, the positioning element(s) 202 may also be oriented parallel to the chord (C) and generally perpendicular to the pitch axis 116. For example, in at least one embodiment, the positioning element(s) 202 may include an elastic cord element 226 stretched along the chord (C) between airflow modifying elements 204 positioned along the leading and trailing edges 128, 130 respectively.

Figure 4:
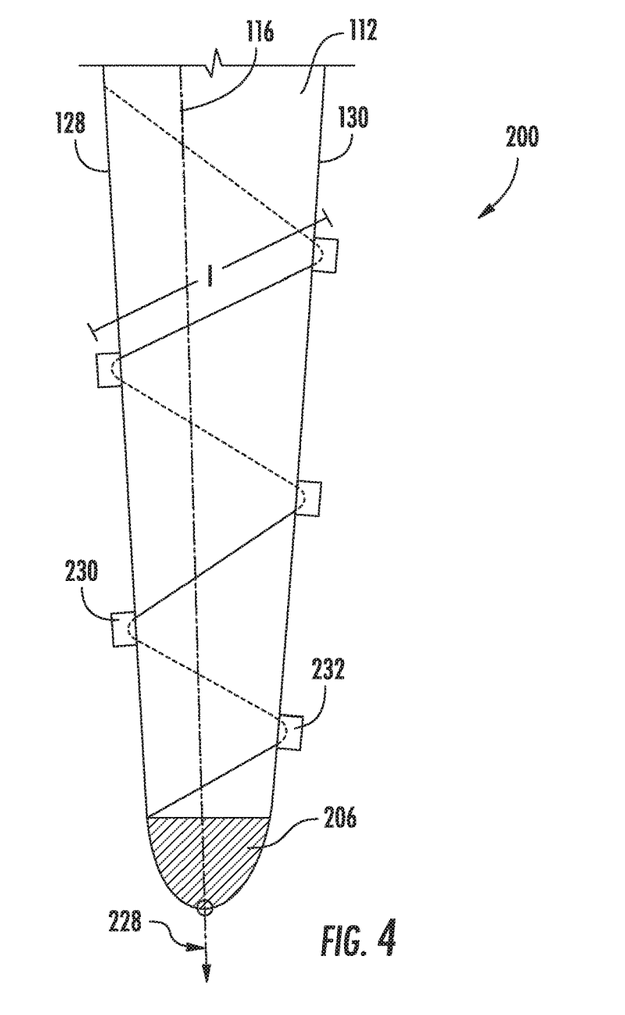
FIG. 4 illustrates a schematic view of a portion of the rotor blade of FIG. 2 according to the present disclosure, particularly illustrating an alternative embodiment of the apparatus for mitigating vortex-shedding vibrations or stall-induced vibrations installed thereon.
Figure 8:
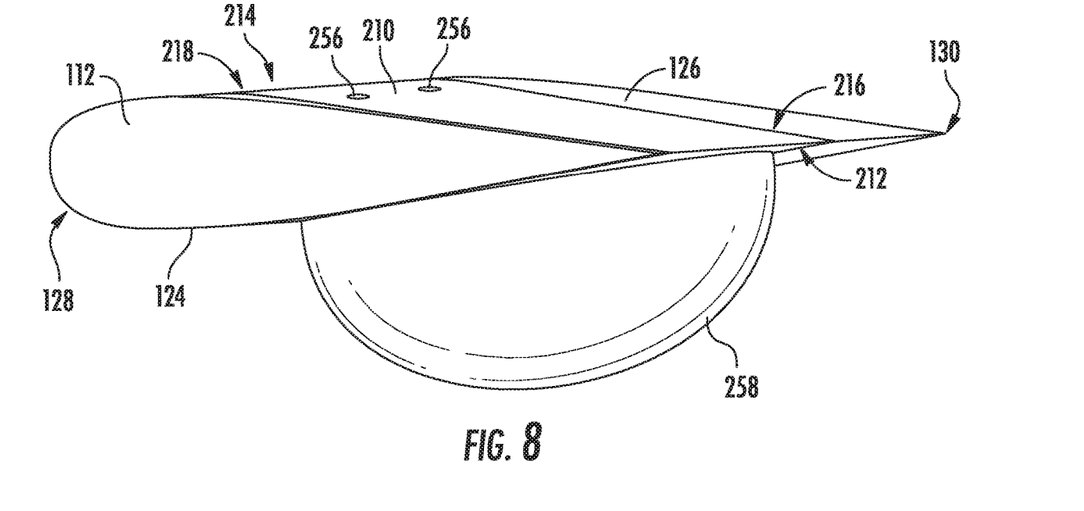
FIG. 8 illustrates a perspective view of a portion of the rotor blade of FIG. 2 according to the present disclosure, particularly illustrating another embodiment of an apparatus for mitigating vortex-shedding vibrations or stall-induced vibrations installed thereon.

In an additional embodiment, such as shown in FIG. 8, the positioning element(s) 202 may be a hollow sleeve 210. Thus, as shown, the hollow sleeve 210 may encapsulate a portion of the rotor blade(s) 112. Further, as shown, the hollow sleeve 210 may have a first end 212 and a second end 214 disposed opposite thereof. The first end 212 may define an opening corresponding to an airfoil shape at a first specified spanwise location 216. The second end 214 may define an opening corresponding to an airfoil shape at a second specified spanwise location 218. In an alternative embodiment, such as depicted in FIG. 4, the second end 214 may be sealed so as to encapsulate the blade tip 120. In certain embodiments, the hollow sleeve 210 may be a woven fabric, a mesh, a plastic, or a composite. In at least one embodiment, the hollow sleeve 210 may be configured to be degradable over a specified interval of time so that the hollow sleeve 210 may fall off the rotor blade(s) 112 with no intervention.

Referring to FIGS. 3A, 4, 5A, 6, and 8, the securing element(s) 206 may, in various embodiments, be configured to encircle a portion of the blade tip 120. Thus, in certain embodiments, the securing element(s) 206 may, for example, be a band, a cord, a belt, or a strap. In an embodiment, the securing element 206 may be a loop having a diameter corresponding to the dimensions of an airfoil at a specified spanwise location of the rotor blade(s) 112. Alternatively, the securing element(s) 206 may be an adhesive strip positioned between the positioning element(s) 202 and the body shell 122. In at least one embodiment, the securing element(s) 206 may be a high friction material, such as rubber, configured to resist a rotational movement around the rotor blade(s) 112. It should be appreciated, that the securing element(s) 206 may, alternatively, be a sleeve, sack, or sock configured to encapsulate the blade tip 120.

As particularly depicted in FIG. 6A, the securing element(s) 206 may, in an embodiment, be a rigid securing element 220. The rigid securing element 220 may, for example, be formed from wood, metal, foam, plastic, composites, or any other suitably rigid material. The rigid securing element 220 may define an opening which corresponds to a cross-section of the rotor blade(s) 112 at a specified spanwise location.

Still referring to FIGS. 3A-8, the airflow modifying element(s) 204 may be any suitable structure configured to disrupt airflow over and/or around the rotor blade(s) 112 in standstill. For example, in various embodiments, such as are depicted in FIGS. 7 and 8, the airflow modifying element(s) 204 may include at least one of a streamer 242, a fence, an inflatable cell 258, a serration, a vortex generator, a flow disruptor, or a combination thereof. In several embodiments, the airflow modifying element(s) 204 may be formed from wood, foam, plastics, composites, metal, fabric, or any other suitable materials. In addition, the airflow modifying element(s) 204 may be buoyant. In further embodiments, the airflow modifying element(s) 204 may be a solid structure or a hollow structure. The airflow modifying element(s) 204 may have fixed external dimensions or may be inflatable. In at least one embodiment, the airflow modifying element(s) 204 may have a diameter which is greater than or equal to 5% of the chord (C). In an embodiment, the airflow modifying element(s) 204 may have a diameter which is less than or equal to 15% of the chord (C) when installed.

In further embodiments, the airflow modifying element(s) 204 may, in an embodiment, be any suitable three-dimensional shape. For example, in various embodiments, the airflow modifying element(s) 204 may be a sphere, a prolate spheroid, a hemisphere, a cube, a rectangular prism, a frustrum, or an irregular three-dimensional shape. In additional embodiments, the airflow modifying element(s) 204 may be a flexible sheet oriented on a plane having one fixed edge or curving so as to have at least two fixed edges. For example, in an embodiment, the airflow modifying element(s) 204 may be a flexible sheet coupled to the trailing edge 130 at between 0.5 and two times the chord pitch and extending to a serrated edge. It should be appreciated that the airflow modifying element(s) 204 may be formed so as to establish a face conforming to a curvature of the rotor blade(s) 112.

Referring again to FIGS. 3A, 4, 5A, and 6, the apparatus 200 may include at least one removal element 228. As shown, the removal element(s) 228 may be configured to act on the securing element(s) 206 so as to initiate the removal of the apparatus 200 from the rotor blade(s) 112 upon completion of the maintenance, repair, or installation operation. In an embodiment, the removal element(s) 228 may be a cord or line coupled to the securing element(s) 206 and extending to the support surface 104. In another embodiment, the removal element(s) 228 may be at least one of a separating feature (e.g., a pull-tab, a perforation, a zipper or other feature configured to encourage a separation at a selected location), a quick-release coupling, or a magnetic catch configured to release the securing element(s) 206 from the rotor blade(s) 112.

Figure 3A:
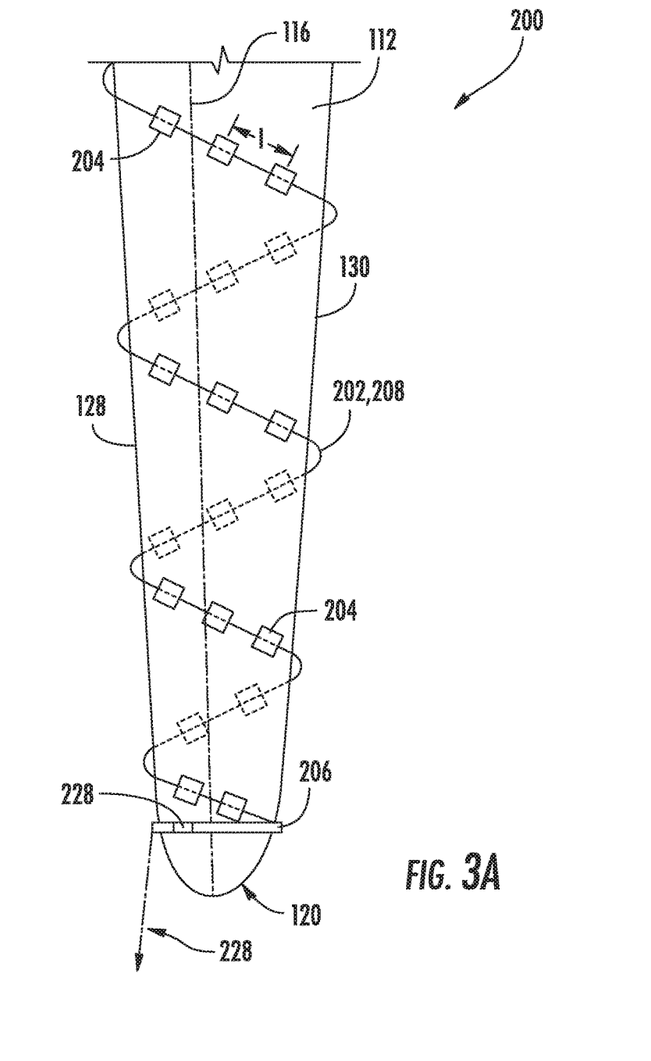
FIG. 3A illustrates a schematic view of a portion of the rotor blade of FIG. 2 according to the present disclosure, particularly illustrating one embodiment of an apparatus for mitigating vortex-shedding vibrations or stall-induced vibrations installed thereon.
Figure 3B:
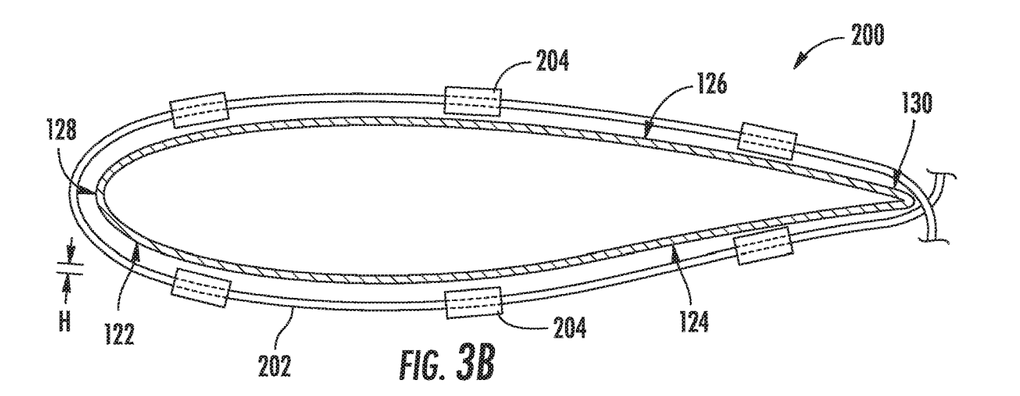
FIG. 3B illustrates a cross-sectional view of the rotor blade and apparatus of FIG. 3A according to the present disclosure.

As depicted particularly in FIGS. 3A-4, the apparatus 200 may include a plurality of airflow modifying elements 204 distributed along and secured to the positioning element(s) 202. In an embodiment, as shown in FIG. 3A, the airflow modifying elements 204 may be distributed at a specified interval (I) along the helically-wrapped cord 208. The specified interval (I) may be selected to ensure that the airflow modifying elements 204 may be distributed across the pressure side 124 and/or the suction side 126 of the rotor blade(s) 112. In an additional embodiment, the plurality of airflow modifying elements 204 may include at least one leading-edge airflow modifying element and at least one trailing-edge airflow modifying element 230, 232 distributed in an alternating pattern along the positioning element(s) 202 and the specified interval (I) may be selected to position the airflow modifying elements 204 along the leading and trailing edges 128, 130. As such, the positioning of the airflow modifying elements 204 relative to the rotor blade(s) 112 may be determined by the specified interval (I) and the pitch of the helically-wrapped cord 208.

Still referring to FIGS. 3A-4, in an exemplary embodiment, the airflow modifying elements 204 may be spheres or prolate spheroids having the cord 208 passing through the center thereof and being fixed at the specified interval (I) along the positioning element(s) 202. In such an embodiment, the distance (H) may be the radius of the airflow modifying elements 204 minus the radius of the cord 208.

Referring particularly to FIGS. 5A and 5B, another embodiment of the apparatus 200 for mitigating vortex-shedding vibrations or stall-induced vibrations in a rotor blade(s) 112 in standstill is depicted. In such an embodiment, the positioning element(s) 202 may include the leading-edge positioning element(s) 222 arranged parallel to the leading edge 128 of the rotor blade(s) 112. The positioning element(s) 202 may also include the trailing-edge positioning element(s) 224 arranged parallel to the trailing edge of the rotor blade(s) 112. The airflow modifying element(s) 204 may include the leading-edge airflow modifying element(s) 230 coupled to the leading-edge positioning element(s) 222. The airflow modifying element(s) 204 may also include the trailing-edge airflow modifying element(s) 232 coupled to the trailing-edge positioning element(s) 224.

Thus, as shown, the leading-edge airflow modifying element(s) 230 may define a leading-edge mounting notch 234 corresponding to a leading-edge profile 236, whereas the trailing-edge airflow modifying element(s) 232 may define a trailing-edge mounting notch 238 corresponding to a trailing-edge profile 240. In at least one embodiment, the leading- and trailing-edge airflow modifying elements 230, 232 may extend around the respective edges from the pressure side 124 to the suction side 126. As such, the apparatus 200 may include additional leading-edge positioning elements 222 and trailing-edge positioning elements 224.

It should be appreciated that, in at least one embodiment, the leading- and trailing-edge airflow modifying elements 230, 232 may also be distributed along the respective positioning elements 202 at specified locations calculated to fix the location of the vortex shedding. The distribution of the leading- and trailing-edge airflow modifying elements 230, 232 may place the respective modifying elements in line along a specified chord (C), establish an alternating spanwise pattern, or a combination thereof.

Figure 6B:
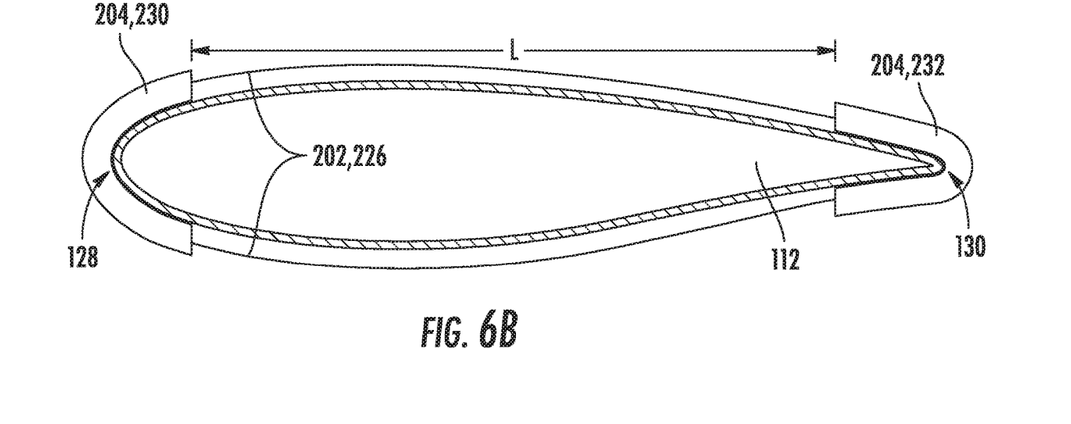
FIG. 6B illustrates a cross-sectional view of the rotor blade and apparatus of FIG. 6A according to the present disclosure.

As depicted in FIGS. 6A-6B, in another embodiment, the apparatus 200 may include the leading-edge airflow modifying element(s) 230 and the trailing-edge airflow modifying element(s) 232 disposed opposite thereof at a specified spanwise location. In at least one embodiment, the leading- and trailing-edge airflow modifying elements 230, 232 may extend around the respective edges from the pressure side 124 to the suction side 126. The leading- and trailing-edge airflow modifying elements 230, 232 may be coupled by the elastic cord element 226. The elastic cord element 226 may limit a separation between the leading-edge airflow modifying element 230 and the trailing-edge airflow modifying element 232 at the specified spanwise location. For example, in an embodiment, the length (L) of the elastic cord element 226 may be adjusted to conform to the length of the chord (C) at a specified spanwise location. As such, in a tapered portion of the rotor blade(s) 112, the length (L) of the elastic cord element 226 may determine the placement of the leading- and trailing-edge airflow modifying elements 230, 232.

In an additional embodiment, such as depicted in FIG. 7, the airflow modifying element(s) 204 may be a streamer 242 (e.g., a flag or other generally planar, flexible sheet). The streamer 242 may have a surface density greater than 300 g/m$^2$. The streamer 242 may, in an additional embodiment, have a surface density less than 750 g/m$^2$. In addition, as shown, the streamer 242 may have a mounting edge 244 secured to the positioning element(s) 202, e.g. that is oriented perpendicular to a chord-wise direction of the rotor blade(s) 112. In such embodiments, the positioning element(s) 202 may be temporarily coupled to at least one of the leading edge 128, the trailing edge 130, or along a line upstream of a flow separation point 246. The positioning element(s) 202 may be coupled to either the suction side 126 or the pressure side 124 of the rotor blade(s) 112. In some embodiments, the streamer 242 may extend from the mounting edge 244 to a length three times the length of the chord (C).

Still referring to FIG. 7, in at least one embodiment, the positioning element(s) 202 may be a cord or strap oriented spanwise along the rotor blade(s). In an embodiment, the securing element(s) 206 may include a first securing element 248 coupled to a first end 250 of the positioning element(s) 202. The securing element(s) 206 may also include a second securing element 252 coupled to an opposing, second end 254 of the positioning element(s) 202. In an alternative embodiment, the securing element(s) 206 may be an adhesive strip positioned between the positioning element(s) 202 and the body shell 122.

Referring now to FIG. 8, still another embodiment of the apparatus 200 for mitigating vortex-shedding or stall-induced vibrations in a rotor blade(s) 112 in standstill is depicted. In such an embodiment, the securing element(s) 206 may be the hollow sleeve 210. The hollow sleeve 210 may define at least one inlet air hole 256. In an embodiment, such as depicted in FIG. 8, the airflow modifying element(s)

204 may be the inflatable cell 258. The inflatable cell 258 may be a flexible plenum which may be fluidly coupled to the inlet air hole(s) 256 and inflated by air passing therethrough. The inflatable cell 258 may be positioned adjacent to the pressure side 124 or the suction side 126. It should be appreciated that when not inflated, or partially inflated, the inflatable cell 258 may act on the rotor blade(s) 112 in a manner similar to the streamer 242 discussed above.

It should be appreciated that the apparatus 200 may, in at least one embodiment include various combinations of the embodiments discussed herein. For example, in an embodiment, the apparatus 200 may include both the inflatable cell 258 and the airflow modifying element(s) 204 distributed along the helically wrapped cord 208. Alternatively, the apparatus 200 may include leading- and trailing-edge airflow modifying elements 230, 232 in combination with one or more streamers 242. The apparatus 200 may, in additional embodiments, include additional combinations of the positioning element(s) 202, the airflow modifying element(s) 204 and the securing element(s) 206 as discussed herein.

Figure 9:
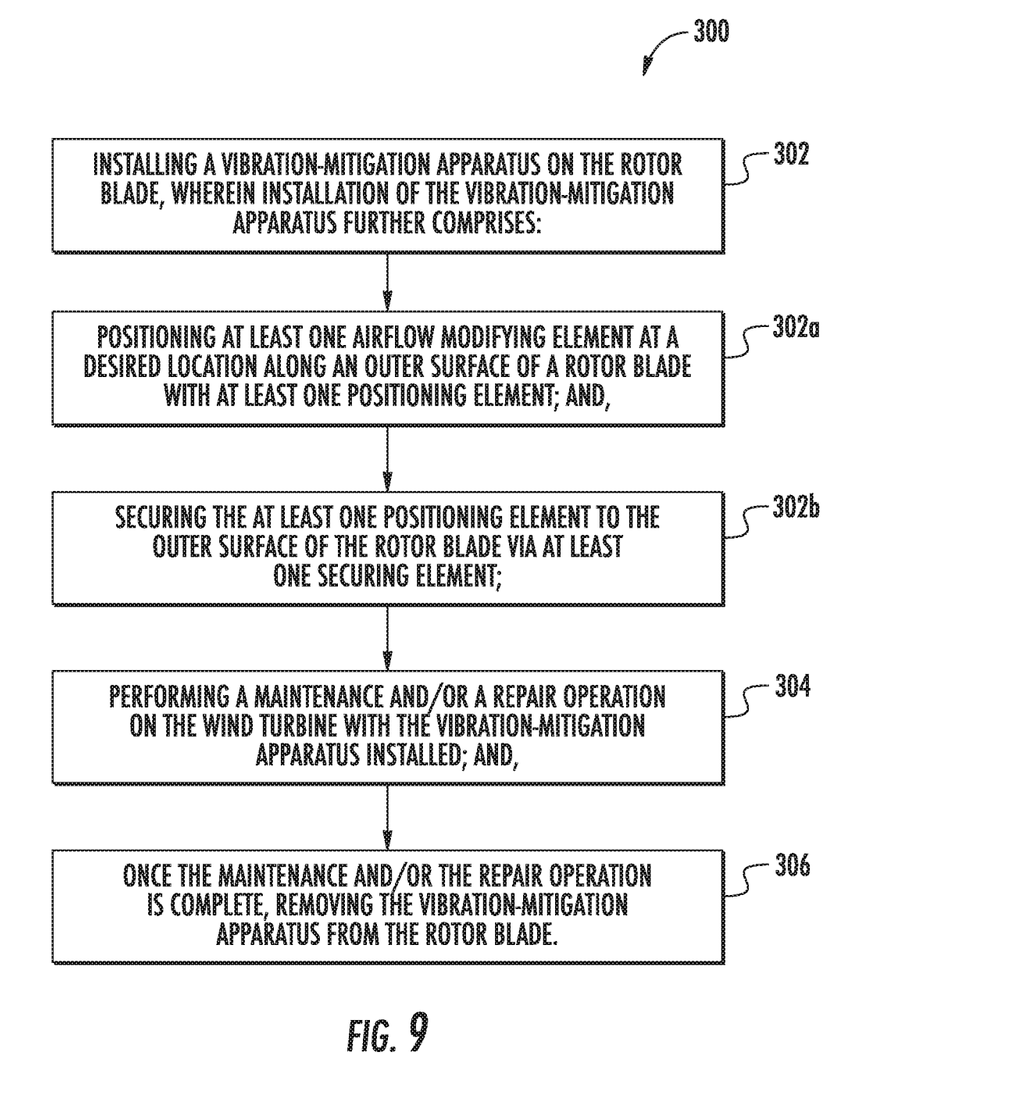
FIG. 9 illustrates a flow diagram of one embodiment of a method for mitigating vortex-shedding vibrations or stall-induced vibrations on one or more rotor blades of a wind turbine during standstill according to the present disclosure.

Referring to FIG. 9, a flow diagram of one embodiment of a method 300 for mitigating vortex-shedding vibrations and/or stall-induced vibrations on one or more rotor blades of a wind turbine during standstill is illustrated. The method 300 may be implemented using, for instance, the apparatus 200 discussed above with reference to FIGS. 3A-8. FIG. 9 depicts steps performed in a particular order for purposes of illustration and discussion. Those of ordinary skill in the art, using the disclosures provided herein, will understand that various steps of the method 300 or any of the other methods disclosed herein may be adapted, modified, rearranged, performed simultaneously or modified in various ways without deviating from the scope of the present disclosure.

As shown at (302), the method 300 includes installing a vibration-mitigation apparatus on the rotor blade. As shown at (302a), the installation of the vibration-mitigation apparatus includes positioning at least one airflow modifying element at a desired location along an outer surface of a rotor blade with at least one positioning element. As shown at (302b), the installation of the vibration-mitigation apparatus includes securing the at least one positioning element to the outer surface of the rotor blade via at least one securing element. As shown at (304), the method 300 includes performing a maintenance and/or a repair operation on the wind turbine with the vibration-mitigation apparatus installed. As shown at (306), the method 300 includes once the maintenance and/or the repair operation is complete, removing the vibration-mitigation apparatus from the rotor blade.

In additional embodiments, positioning the at least one airflow modifying element at the desired location may also, in accordance with the present disclosure, include helically wrapping the cord element around a portion of the rotor blade so as to disrupt airflow over a chordwise section of the rotor blade. In another embodiment, positioning the at least one airflow modifying element at the desired location may also include positioning an edge of the at least one airflow modifying element adjacent to at least one of a leading edge, a trailing edge, or a long a line upstream of a flow separation point on either a suction side or a pressure side of the rotor blade. In a further embodiment, positioning the at least one airflow modifying element at the desired location may also include encapsulating a portion of the rotor blade within the hollow sleeve and coupling the inflatable cell to the hollow sleeve and operably coupling the inflatable cell to the inlet air hole.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

For reasons of completeness, various aspects of the present disclosure are set out in the following numbered clauses:

Clause 1. An apparatus for mitigating vortex-shedding vibrations or stall-induced vibrations on one or more rotor blades of a wind turbine during standstill, the apparatus comprising:
at least one positioning element located between a blade tip section and a blade root section thereof, the at least one positioning element adapted for wrapping around at least a portion of the rotor blade;
at least one airflow modifying element coupled to the at least one positioning element, the at least one airflow modifying element defining a height relative to a surface of the rotor blade; and,
at least one securing element operably coupled to the at least one positioning element for temporarily securing the at least one airflow modifying element to the rotor blade.

Clause 2. The apparatus of clause 1, wherein the at least one positioning element comprises at least one cord member helically wrapped around a portion of the rotor blade.

Clause 3. The apparatus of any preceding clause, wherein the helically-wrapped cord element has a pitch greater than or equal to one half of a chord of the rotor blade up to less than or equal to six times the chord of the rotor blade, wherein at least a portion of the helically-wrapped cord element is separated from the surface of the rotor blade by a distance defined by the at least one airflow modifying element.

Clause 4. The apparatus of any preceding clause, wherein the at least one airflow modifying element comprises at least one of a streamer, a fence, an inflatable cell, a serration, a vortex generator, and/or a flow disruptor.

Clause 5. The apparatus of any preceding clause, wherein the at least one airflow modifying element comprises a plurality of airflow modifying elements distributed along and secured to the at least one positioning element.

Clause 6. The apparatus of any of clauses 1, 2, 3, or 5, wherein the plurality of airflow modifying elements comprises leading-edge airflow modifying elements and trailing-edge airflow modifying elements, wherein the leading-edge airflow modifying elements and the trailing-edge airflow modifying elements are distributed in an alternating pattern along the at least one positioning element.

Clause 7. The apparatus of any preceding clause, wherein the at least one airflow modifying element comprises at least one leading-edge airflow modifying element and at least one trailing-edge airflow modifying element disposed opposite thereof, wherein the at least one positioning element is constructed of an elastic cord element coupled between the leading- and trailing-edge airflow modifying elements, wherein the elastic cord element limits a separation between the leading- and/or trailing-edge airflow modifying elements at a specified spanwise location of the rotor blade.

Clause 8. The apparatus of any preceding clause, wherein the at least one positioning element comprises a leading-edge positioning element arranged parallel to a leading edge of the rotor blade and a trailing-edge positioning element arranged parallel to a trailing edge of the rotor blade, the at least one airflow modifying element comprises at least one leading-edge airflow modifying element coupled to the leading-edge positioning element and at least one trailing-edge airflow modifying element coupled to the trailing-edge positioning element, the leading-edge airflow modifying element defining a leading-edge mounting notch corresponding to a leading-edge profile, and the trailing-edge airflow modifying element defining a trailing-edge mounting notch corresponding to a trailing-edge profile.

Clause 9. The apparatus of any preceding clause, wherein the at least one airflow modifying element has a mounting edge, the airflow modifying element is coupled along the mounting edge to the at least one positioning element, the at least one positioning element being oriented perpendicular to a chordwise direction of the rotor blade, the at least one positioning element being temporarily coupled to at least one of a leading edge, a trailing edge, or along a line upstream of a flow separation point on either a suction side or a pressure side of the rotor blade.

Clause 10. The apparatus of clause 9, wherein the at least one positioning element comprises a cord oriented spanwise along the rotor blade, and wherein the at least one securing element comprises a first securing element coupled to a first end of the positioning element and a second securing element coupled to an opposing, second end of the positioning element.

Clause 11. The apparatus of any of clauses 1 or 4, wherein the at least one positioning element comprises a hollow sleeve configured to encapsulate a portion of the rotor blade, the hollow sleeve defining at least one inlet air hole.

Clause 12. A method for mitigating vortex-shedding vibrations or stall-induced vibrations on one or more rotor blades of a wind turbine during standstill, the method comprising:
 installing a vibration-mitigation apparatus on the rotor blade, wherein installation of the vibration-mitigation apparatus further comprises:
  positioning at least one airflow modifying element at a desired location along an outer surface of a rotor blade with at least one positioning element, and
  securing the at least one positioning element to the outer surface of the rotor blade via at least one securing element,
 performing an installation, a commissioning, a maintenance and/or a repair operation on the wind turbine with the vibration-mitigation apparatus installed; and,
 once the installation, commission, maintenance and/or the repair operation is complete, removing the vibration-mitigation apparatus from the rotor blade.

Clause 13. The method of clause 12, wherein the at least one airflow modifying element comprises at least one of a streamer, a fence, an inflatable cell, a serration, a vortex generator, and/or a flow disruptor.

Clause 14. The method of any of clauses 12 or 13, wherein the at least one positioning element comprises a cord element, wherein positioning the at least one airflow modifying element at the desired location further comprises helically wrapping the cord element around a portion of the rotor blade so as to disrupt airflow over a chordwise section of the rotor blade, wherein at least a portion of the at least one positioning element is separated from the outer surface of the rotor blade by a distance defined by the at least one airflow modifying element.

Clause 15. The method of any of clauses 12, 13, or 14, wherein positioning the at least one airflow modifying element at the desired location further comprises positioning an edge of the at least one airflow modifying element adjacent to at least one of a leading edge, a trailing edge, or along a line upstream of a flow separation point on either a suction side or a pressure side of the rotor blade.

Clause 16. The method of any of clauses 12 or 13, wherein the at least one positioning element comprises a hollow sleeve defining an inlet air hole and the at least one airflow modifying element comprises the inflatable cell, wherein positioning the at least one airflow modifying element at the desired location further comprises encapsulating a portion of the rotor blade within the hollow sleeve and coupling the inflatable cell to the hollow sleeve and operably coupling the inflatable cell to the inlet air hole, wherein the inflatable cell is disposed adjacent to a pressure side or a suction side of the rotor blade.

Clause 17. A rotor assembly for a wind turbine, comprising:
 a rotor hub in standstill;
 at least one rotor blade comprising a leading edge and a trailing edge disposed between a tip portion and a root portion opposite thereof, the root portion being coupled to the rotor hub; and,
 an apparatus for mitigating vortex-shedding vibrations and/or stall-induced vibrations on the at least one rotor blade during standstill, the apparatus comprising:
  at least one positioning element located between a blade tip section and a blade root section thereof, the at least one positioning element adapted for wrapping around at least a portion of the rotor blade,
  at least one airflow modifying element coupled to the at least one positioning element, the at least one airflow modifying element defining a height relative to a surface of the rotor blade, and,
  at least one securing element operably coupled to the at least one positioning element for temporarily securing the at least one airflow modifying element to the rotor blade.

Clause 18. The rotor assembly of clause 17, wherein the at least one airflow modifying element comprises at least one of a streamer, a fence, an inflatable cell, a serration, a vortex generator, and/or a flow disruptor.

Clause 19. The rotor assembly of any of clauses 17 or 18, wherein the at least one positioning element comprises a cord helically wrapped around a portion of the rotor blade, wherein the at least one airflow modifying element comprises a plurality of airflow modifying elements distributed along the at least one positioning element.

Clause 20. The rotor of assembly any of clauses 17, 18, or 19, wherein the at least one airflow modifying element has a mounting edge, the airflow modifying element is coupled along the mounting edge to the at least one positioning element, the at least one positioning element being oriented perpendicular to a chordwise direction of the rotor blade, the at least one positioning element being temporarily coupled to at least one of a leading edge, a trailing edge, or along a line upstream of a flow separation point on either a suction side or a pressure side of the rotor blade.

What is claimed is:

1. An apparatus for mitigating vortex-shedding vibrations or stall-induced vibrations on one or more rotor blades of a wind turbine during standstill, the apparatus comprising:
    at least one positioning element located between a blade tip section and a blade root section of a respective rotor blade of the one or more rotor blades, the at least one positioning element adapted for wrapping around at least a portion of the respective rotor blade;
    at least one airflow modifying element coupled to the at least one positioning element, the at least one airflow modifying element defining a height relative to a surface of the respective rotor blade; and,
    at least one securing element operably coupled to the at least one positioning element for temporarily securing the at least one airflow modifying element to the respective rotor blade;
    wherein the at least one positioning element comprises at least one cord member helically wrapped around a portion of the respective rotor blade.

2. The apparatus of claim 1, wherein the helically-wrapped cord element has a pitch greater than or equal to one half of a chord of the respective rotor blade up to less than or equal to six times the chord of the respective rotor blade, wherein at least a portion of the helically-wrapped cord element is separated from the surface of the respective rotor blade by a distance defined by the at least one airflow modifying element.

3. The apparatus of claim 1, wherein the at least one airflow modifying element comprises at least one of a streamer, a fence, an inflatable cell, a serration, a vortex generator, and/or a flow disruptor.

4. The apparatus of claim 1, wherein the at least one airflow modifying element comprises a plurality of airflow modifying elements distributed along and secured to the at least one positioning element.

5. The apparatus of claim 1, wherein the plurality of airflow modifying elements comprises leading-edge airflow modifying elements and trailing-edge airflow modifying elements, wherein the leading-edge airflow modifying elements and the trailing-edge airflow modifying elements are distributed in an alternating pattern along the at least one positioning element.

6. A method for mitigating vortex-shedding vibrations or stall-induced vibrations on one or more rotor blades of a wind turbine during standstill, the method comprising:
    installing a vibration-mitigation apparatus on a rotor blade of the one or more rotor blades, wherein installation of the vibration-mitigation apparatus further comprises:
    positioning at least one airflow modifying element at a desired location along an outer surface of the rotor blade with at least one positioning element wherein the at least one positioning element comprises at least one cord member helically wrapped around a portion of the respective rotor blade; and,
    securing the at least one positioning element to the outer surface of the rotor blade via at least one securing element;
    performing an installation, a commissioning, a maintenance and/or a repair operation on the wind turbine with the vibration-mitigation apparatus installed; and,
    once the installation, commissioning, maintenance and/or the repair operation is complete, removing the vibration-mitigation apparatus from the rotor blade.

7. The method of claim 6, wherein the at least one airflow modifying element comprises at least one of a streamer, a fence, an inflatable cell, a serration, a vortex generator, and/or a flow disruptor.

8. The method of claim 6, wherein the at least one positioning element is positioned so as to disrupt airflow over a chordwise or spanwise section of the rotor blade, wherein at least a portion of the at least one positioning element is separated from the outer surface of the rotor blade by a distance defined by the at least one airflow modifying element.

9. The method of claim 6, wherein positioning the at least one airflow modifying element at the desired location further comprises positioning an edge of the at least one airflow modifying element adjacent to at least one of a leading edge, a trailing edge, or along a line upstream of a flow separation point on either a suction side or a pressure side of the rotor blade.

* * * * *